United States Patent
Sardar et al.

(10) Patent No.: US 12,510,687 B2
(45) Date of Patent: Dec. 30, 2025

(54) USING MACHINE LEARNING TO PREDICT AQUIFERS FROM GROUNDWATER CHEMISTRY DATA

(71) Applicant: Saudi Arabian Oil Company, Dhahran (SA)

(72) Inventors: Essam Hasan Sardar, Dhahran (SA); Fahad Ahmed Souid, Dhahran (SA); Fatai A. Anifowose, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 394 days.

(21) Appl. No.: 18/179,034

(22) Filed: Mar. 6, 2023

(65) Prior Publication Data

US 2024/0302563 A1 Sep. 12, 2024

(51) Int. Cl.
*G01V 9/02* (2006.01)
*G01N 33/24* (2006.01)

(52) U.S. Cl.
CPC ............ *G01V 9/02* (2013.01); *G01N 33/246* (2013.01)

(58) Field of Classification Search
CPC ............................... G01N 33/246; G01V 9/02
See application file for complete search history.

(56) References Cited

U.S. PATENT DOCUMENTS

| 9,005,983 | B2 | 4/2015 | McGuinness et al. | |
|---|---|---|---|---|
| 11,475,335 | B2 * | 10/2022 | Routray | G06N 20/00 |
| 2017/0139078 | A1 * | 5/2017 | Knight | G16B 10/00 |
| 2018/0322941 | A1 * | 11/2018 | Krishnan | G16H 10/40 |

(Continued)

FOREIGN PATENT DOCUMENTS

| WO | WO-2023081492 A1 * | 5/2023 | ............... G06N 7/01 |
|---|---|---|---|
| WO | WO-2023105255 A1 * | 6/2023 | ............. G01N 33/20 |

OTHER PUBLICATIONS

Agrawal et al., "Exploring artificial intelligence techniques for groundwater quality assessment," Water, Apr. 2021, 13(9):1172, 27 pages.

(Continued)

*Primary Examiner* — Stephanie E Bloss
(74) *Attorney, Agent, or Firm* — Fish & Richardson P.C.

(57) ABSTRACT

Systems and methods include a computer-implemented method for predicting locations of aquifers. Missing measurements in groundwater chemistry data from aquifers are replaced with calculated equivalents. The groundwater chemistry data is split into a model building/optimizing dataset and a model validation dataset. The groundwater chemistry data is normalized. A dimensionality reduction is performed on the groundwater chemistry data, including identifying principal components. An aquifer prediction model is generated and trained using the model building/optimizing dataset and machine learning. Performance of the aquifer prediction model is validated using the model validation dataset. Locations of aquifers are predicted during production of a new well using the aquifer prediction model and groundwater chemistry data for the new well. Settings, targets, and parameters of equipment used for drilling are changed based on the predicted locations of aquafers and the groundwater chemistry of the aquifers.

14 Claims, 3 Drawing Sheets

(56) References Cited

U.S. PATENT DOCUMENTS

2023/0315704 A1* 10/2023 Walters ............... G06F 16/2228
 707/741
2025/0046401 A1* 2/2025 Porlan ................... G16C 20/30

OTHER PUBLICATIONS

Alagha et al., "Modeling of nitrate concentration in groundwater using artificial intelligence approach—a case study of Gaza coastal aquifer," Environmental Monitoring and Assessment, Aug. 2013, 186(1):35-45, 11 pages.

Bedi et al., "Comparative evaluation of machine learning models for groundwater quality assessment," Environmental Monitoring and Assessment, Nov. 2020, 192(12):1-23, 41 pages.

Edmunds et al., "Baseline Report Series: The Chalk of Dorset," British Geological Survey and the Environment Agency, 2002, 54 pages.

Edmunds et al., "Baseline trace element occurrence pin the principal aquifers of the UK," British Geological Survey Wallingford, Feb. 1988, 322 pages.

El Bilali et al., "Groundwater quality forecasting using machine learning algorithms for irrigation purposes," Agricultural Water Management, 2021, 245:106625, 13 pages.

Fontenot et al., "An evaluation of water quality in private drinking water wells near natural gas extraction sites in the Barnett Shale formation," Environmental Science & Technology, Jul. 2013, 47(17):10032-10040, 9 pages.

Isazadeh et al., "Support vector machines and feed-forward neural networks for spatial modeling of groundwater qualitative parameters," Environmental Earth Sciences, Aug. 2017, 76(17):1-14, 14 pages.

Kadkhodaie, "Application of Fuzzy Inference System to Estimating Rock Properties from Well Logs and Seismic Data," Application of Artificial Intelligence Methods in Geosciences and Hydrology, Dec. 2015, 37 pages.

Kenda et al., "Groundwater modeling with machine learning techniques: Ljubljana polje aquifer," Multidisciplinary Digital Publishing Institute Proceedings, Aug. 2018, 2(11):697, 8 pages.

Khaki et al., "Simulation of groundwater level through artificial intelligence system," Environmental Earth Sciences, Dec. 2014, 73(12):8357-8367, 11 pages.

Kouadri et al., "Prediction of irrigation groundwater quality parameters using ANN, LSTM, and MLR models," Environmental Science and Pollution Research, Oct. 2021, 29(14):21067-21091, 25 pages.

Nathan et al., "Application of ANN and MLR models on groundwater quality using CWQI at Lawspet, Puducherry in India," Journal of Geoscience and Environment Protection, Mar. 2017, 5(03):99, 26 pages.

Nourani et al., "Hybrid of SOM-clustering method and wavelet—ANFIS approach to model and infill missing groundwater level data," Journal of Hydrologic Engineering, 2016, 21(9):05016018, 19 pages.

Plummer et al., "Old groundwater in parts of the upper Patapsco aquifer, Atlantic Coastal Plain, Maryland, USA: evidence from radiocarbon, chlorine-36 and helium-4," Hydrogeology Journal, 2012, 20(7):1269, 26 pages.

Raheja et al., "Prediction of groundwater quality indices using machine learning algorithms," Water Practice & Technology, 2022, 17(1):336-351, 16 pages.

Sahour et al., "A comparative analysis of statistical and machine learning techniques for mapping the spatial distribution of groundwater salinity in a coastal aquifer," Journal of Hydrology, Jul. 2020, 12 pages.

Sanchez-Martos et al., "Assessment of groundwater quality by means of self-organizing maps: application in a semiarid area," Environmental Management, 2002, 30(5):0716-0726, 11 pages.

Sanford et al., "Hydrochemical tracers in the middle Rio Grande Basin, USA: 2. Calibration of a groundwater-flow model," Hydrogeology Journal, 2004, 12(4):389-407, 19 pages.

Senoro et al., "Groundwater quality monitoring using in-situ measurements and hybrid machine learning with empirical Bayesian kriging interpolation method," Applied Sciences, Dec. 2021, 12(1):132, 23 pages.

Singha et al., "Prediction of groundwater quality using efficient machine learning technique," Chemosphere, Mar. 2021, 13 pages.

Taormina et al., "Artificial neural network simulation of hourly groundwater levels in a coastal aquifer system of the Venice lagoon," Engineering Applications of Artificial Intelligence, Feb. 2012, 25(8):1670-1676, 7 pages.

Tayfur et al., "Supervised intelligent committee machine method for hydraulic conductivity estimation," Water Resources Management, Feb. 2014, 28(4):1173-1184, 12 pages.

Tran et al., "Evaluating the predictive power of different machine learning algorithms for groundwater salinity prediction of multilayer coastal aquifers in the Mekong Delta, Vietnam," Ecological Indicators, 2021, 14 pages.

* cited by examiner

USING MACHINE LEARNING TO PREDICT AQUIFERS FROM GROUNDWATER CHEMISTRY DATA

TECHNICAL FIELD

The present disclosure applies to predicting aquifers in arid regions for oil and natural gas operations and water supply.

BACKGROUND

The main water supply in arid areas is derived from groundwater. Sustainable development and management of groundwater resources in arid regions are essential practices, especially in areas with minimum rainfall and recharge rates and increased water demand. One of the main strategies to ensure sustainable groundwater use is to establish quality baselines for aquifers that are under development. During drilling operations, e.g., for oil wells, it is essential to know the locations, depths, and groundwater quality of aquifers. Such robust monitoring practice should underpin water quality guidelines and steer policy makers towards better groundwater management, laying the foundations for sustainable development and protection of shallow groundwater resources.

SUMMARY

The present disclosure describes techniques that can be used for predicting the locations of aquafers, their depths underground, and groundwater quality in oil and natural gas fields in arid regions. In some implementations, a computer-implemented method includes the following. Missing measurements in groundwater chemistry data from aquifers are replaced with calculated equivalents. The groundwater chemistry data is split into a model building/optimizing dataset and a model validation dataset. The groundwater chemistry data is normalized. A dimensionality reduction is performed on the groundwater chemistry data, including identifying principal components. An aquifer prediction model is generated and trained using the model building/optimizing dataset and machine learning. Performance of the aquifer prediction model is validated using the model validation dataset. Locations of aquifers are predicted during production of a new well using the aquifer prediction model and groundwater chemistry data for the new well. Settings, targets, and parameters of equipment used for drilling are changed based on the predicted locations of aquafers and the groundwater chemistry of the aquifers.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Aquifers can be identified from the groundwater chemistry data that is used as inputs to a workflow that is implemented as application code, for example. The groundwater chemistry data can include TDS (Total Dissolved Solids), Sodium (Na), Calcium (Ca), Magnesium (Mg), Chloride (Cl), Sulfate (SO4), Carbonate ($CO_3$), Bicarbonate ($HCO_3$) and pH. Once the application code creates the necessary pattern, the classification can be used to predict the general chemistry of a given aquifer's groundwater in a frontier area. The prediction can be used in choosing the proper aquifer to be penetrated according to the groundwater use either for human consumption, drilling activities, or facility water supply. Quality changes of groundwater can also be identified, creating a robust medium for smart monitoring. The technical problem of a lack of groundwater chemistry information in frontier and remote areas can also be solved. The information is essential as part of upstream exploration general workflow for drilling facility and utilities water supply. Current techniques are typically time-consuming, e.g., with a minimum period of six months per model, and one year per simulation. The technical problem of a lack of real-time hydrochemical model update. The term real-time can correspond, for example, to events (e.g., time hydrochemical model updates) that occur within a specified period of time, such as within one minute. Current systems lack real evaluation of structure impact on groundwater chemistry, including accurate estimation of aquifer candidacy, streamlined water well design, efficient locating of water well, automated retrieval of water level and chemistry data, creation of a reference for groundwater chemistry data, and the evaluation of current and future fates of the groundwater quality. The techniques of the present disclosure solve changes to groundwater quality due to salinization or contamination and propose alternative water supply resources. It can also be used to validate current numerical modeling and suggest enhances in terms of uncertainty and sensitivity analysis. Results can be applied elsewhere to predict groundwater chemistry, depth, and water level in areas with no control points, and to suggest enhancements to proposed water well designs and drilling programs. The techniques of the present disclosure can be used in choosing the best aquifer to utilize for water supply, monitoring groundwater quality, and enhancing groundwater models and water well designs.

Current techniques typically do not integrate all available inputs (including, for example, geology, hydrogeology, and chemistry). Current techniques typically lack the use of principal component analysis (PCA) and other multivariate statistical methods of preprocessing. Current techniques typically do not test other machine learning (ML) algorithms other than ANN and SVM. By comparison, techniques of the present disclosure can be used to evaluate other ML algorithms such as Naive Bayes (NB), Decision Tree (DT), K-Nearest Neighbor (KNN), and Random Forest (RF). Conceptual/numerical modeling techniques lack ML algorithms (e.g., fixed uncertainty). Techniques of the present disclosure can be used to apply customized weight and bias values. Conceptual/numerical modeling used in current techniques is time-consuming and deploys univariate cases.

Advantages provided by the techniques of the present disclosure can include at least the following as compared to current systems. The techniques can integrate multivariate statistical methods and ML algorithm in an application, and as a result, reduce the number of variables and increases accuracy of testing (e.g., aquifer prediction).

Various ML algorithms can be included in the application, e.g., Naive Bayes (NB), Decision Tree (DT), K-Nearest Neighbor (KNN), and Random Forest (RF), including ANN, SVM, and LDA). The use and results comparison of using the various ML algorithms can provide a robust comparison in order to identify which ML algorithm is best suited in each run. This process can be done automatically and can provide the best algorithm based on results of testing accuracy. Real groundwater chemistry data (e.g., the "11000" dataset (11000 observation for up to 11 variables), which is one of the largest groundwater chemistry datasets used in ML training) can be used for training and testing. This can provide robust results and weights to be tested on other aquifers in the region. Doing so can quantify the number of chemical parameters that can be used with confidence in aquifer prediction problems. Use of the techniques of the present disclosure can save time by defining groundwater chemistry and quality in new areas prior to drilling water wells. The prediction of groundwater chemistry in a newly developed AI workflow can provide a general idea and steer decision making in terms of water well drilling and location, and ensure compliance with Water Law guidelines and executive regulations.

Using the techniques of the present disclosure can save time by defining aquifer penetration using groundwater chemistry data. Further development of the techniques can provide insights into which aquifer should be penetrated and used for groundwater from a quality point of view.

Further advantages of using the techniques of the present disclosure can include the following. The techniques not only consider the complex geological structure, but also evaluate the structural impact on groundwater chemistry using ML as opposed to conceptual/numerical modeling (which has a disadvantage of requiring user intervention to evaluate static models). Conceptual/numerical modeling typically requires user intervention for error evaluation. By comparison, techniques of the present disclosure use ML to adjust inputs/initial output for minimum MSE. Evaluation of the "11000" groundwater chemistry dataset can provide robust predictions in areas with limited control, which can steer decision making on future water well design prior to drilling. Multivariate statistical analysis techniques (e.g., PCA) can be used as a classification method for preprocessing, which can lead to performing ML regression tasks with more confidence. PCA can be used to increase the accuracy of ML algorithms in predicting aquifers and groundwater reservoirs.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for predicting the locations of aquifers in oil and natural gas fields in arid regions. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Geochemical characterization of basinal groundwater systems does not only provide a concrete baseline of different water types, migration paths, and water evolution, but it is also used as a verification tool to refine previously constructed static and dynamic models (Plummer et al., 2012). It also provides key information on the effects of major structural and stratigraphic features of the basin on groundwater/fluids flow and changes in their quality (Sanford et al., 2004). These steps can benefit from machine learning techniques, which not only have the ability to cut time and cost of conventional groundwater modelling, but can also provide robust monitoring of groundwater quality in arid regions.

The present disclosure describes a workflow that can be used to identify aquifers from groundwater chemistry data using a supervised machine learning (ML) methodology based on classification. This approach can make it easier to infer a corresponding aquifer in certain possible situations where water samples are available without proper labels and identification tags. An optimized ML model can be built based on 11000 of labeled samples consisting of water chemistry data (9 variables) and their aquifer. Optimizing can refer to achieving identification of aquifers from groundwater chemistry values that indicate or result in a performance greater than a pre-predefined threshold. In the likely case of an unlabeled water sample, the chemistry can be measured and the data can be passed into the model to predict the aquifer. This process helps the industry in more efficient utilization of data, the rectification of missing aquifer data, and may help to build an accurate aquifer database for the industry.

A workflow can be used that incorporates and superimposes groundwater chemistry data with aquifer geological structure using ML algorithms. The workflow can be used to classify aquifers using hydrochemical properties as inputs. The properties include TDS (Total Dissolved Solids), Sodium (Na), Calcium (Ca), Magnesium (Mg), Chloride (Cl), Sulfate (SO4), Carbonate (CO3), Bicarbonate (HCO3), and pH along with their corresponding aquifers.

Figure 1:
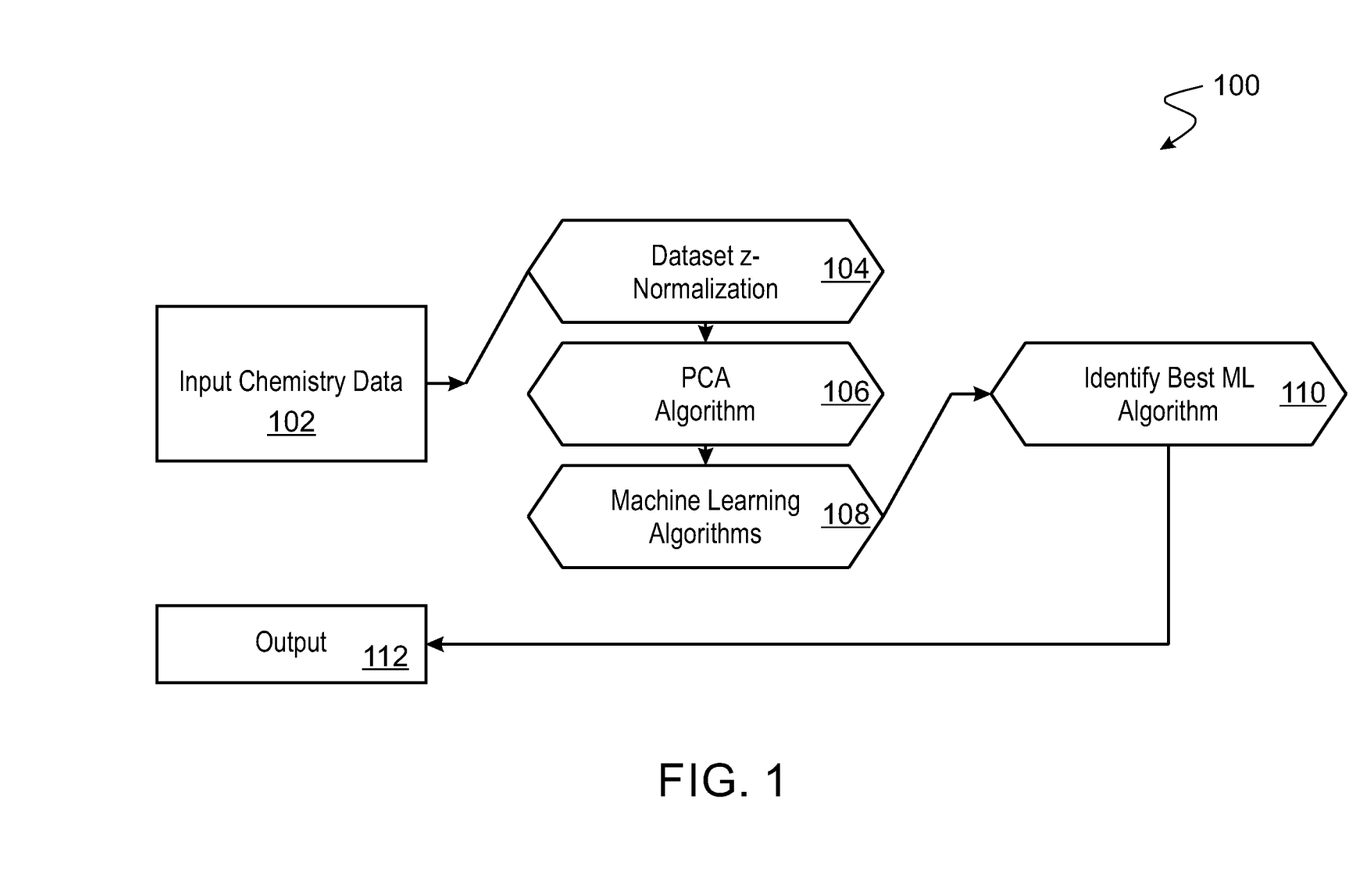
FIG. 1 is a flow chart of an example of a workflow for using machine learning to predict aquifers from water chemistry data, according to some implementations of the present disclosure.

FIG. 1 is a flow chart of an example of a workflow 100 for using machine learning to predict aquifers from water chemistry data, according to some implementations of the present disclosure. The workflow 100 can include the following steps in this order or in different orders, and with additional steps (which may be optional). At 102, in a data filling step, missing measurements can be replaced with their calculated equivalents. At 104, in a data normalization step, Z-score normalization can provide a recommended statistical requirement for the next step, PCA. The data normalization step can include normalizing every value in the chemistry data, e.g., so that the mean of all of the values is 0 and the standard deviation is 1. This forces the values in a value range between −1 and 1 and ensures that the dataset has uniform distribution. A dimensionality reduction step involves applying a PCA algorithm (at 106) on the chemistry data to reduce the dimensionality and the number of variables of the dataset to those with the highest influence. In a model building and training, instead of using the original hydrochemical data, the output of the PCA comprising the first three principal components can be used to build the ML models (at 108). The data can be split into two datasets, e.g., in the s 70:30 ratio (training versus validation). The 70% of the data, along with the corresponding aquifers, can be used to build and optimize the ML models. A model validation involves using the remaining 30% of the data, which comprises only the input (e.g., the first three principal components) without the labels (aquifers) used to validate the performance of the models. A model selection step can use the results of the training and validation processes. At 110, the best performing model can be selected for use in a production mode. At 112, the best performing model is output.

Applying PCA on the dataset can enhance the subsequent ML learning classification. The chemistry data can first be z-normalized before applying PCA. In some implementations, the equation used for normalization is:

$$Z = \frac{x - \mu}{\sigma} \tag{1}$$

where z is the normalized result of the original values x, μ is the mean of the data, and σ is the standard deviation of the data.

The normalization is used to reduce variabilities in terms of scale (normalize large values with low values) and unit (normalize concentrations with pH values). The workflow then applies different ML algorithms such as Linear Discriminant Analysis (LDA), Artificial Neural Network (ANN), Naive Bayes (NB), Decision Tree (DT), Support Vector Classification (SVC), K-Nearest Neighbor (KNN), and Random Forest (RF). The workflow then chooses the best ML algorithm based on training and testing accuracy measurements. The code was seen to successfully classify aquifers according to their hydrochemical parameters with as high as 99% accuracy.

Figure 2:
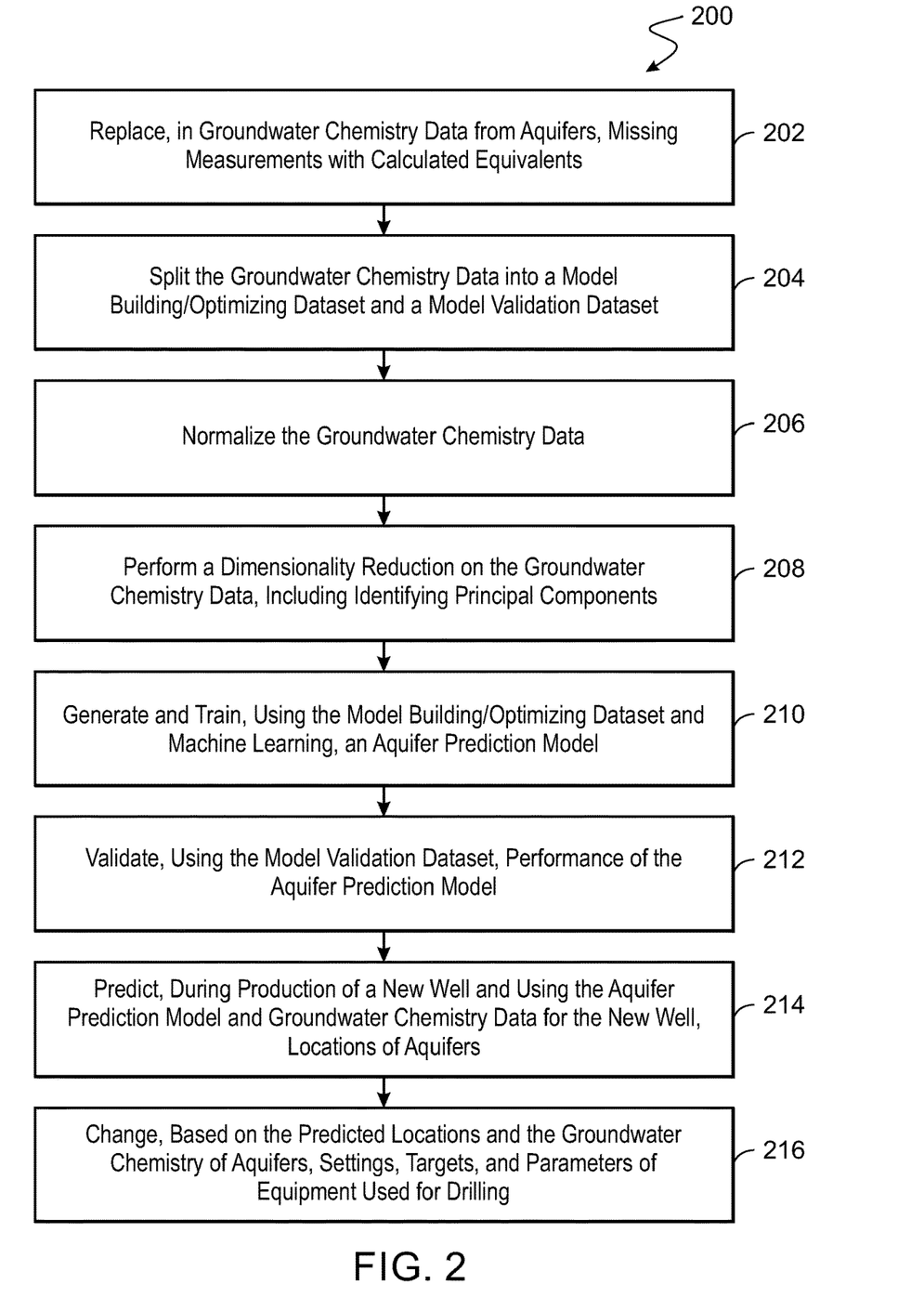
FIG. 2 is a flowchart of another example of a method for using machine learning to predict aquifers from water chemistry data, according to some implementations of the present disclosure.

FIG. 2 is a flowchart of another example of a method 200 for using machine learning to predict aquifers from water chemistry data, according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 202, missing measurements in groundwater chemistry data are replaced with calculated equivalents. This step is available only for TDS (Total Dissolved Solids), which can be approximated using the sum of the major ions measured for the groundwater samples. From 202, method 200 proceeds to 204.

At 204, the groundwater chemistry data for principal components-Principal Component Analysis (PCA) is performed on the groundwater chemistry dataset, at 208, and the first 3 principal components (PCs) are considered for model training and validation dataset (step 208)—is split into a model building/optimizing dataset and a model validation dataset. The split can be 70% for the model building/optimizing dataset and 30% for the model validation dataset, for example. The splitting of aquifer by name, water level, and depth takes place before the normalization step (step 206), using split table with respect to row values (target==>aquifer). This step is essential because only chemistry data, water level, and depth to aquifer are typically z-normalized. The splitting enhances training the dataset and reduces error significantly. From 204, method 200 proceeds to 206.

At 206, the groundwater chemistry data is normalized. As an example, the values can be normalized into a range of −1 to 1. From 206, method 200 proceeds to 208.

At 208, a dimensionality reduction is performed on the groundwater chemistry data, including identifying principal components of the groundwater chemistry data to reduce the dimensionality and a number of variables of the dataset to those with the highest influence. Principal components can be identified, for example, by applying Principal Component Analysis (PCA). In some implementations, reduction occurs down to three principal components. From 208, method 200 proceeds to 210.

At 210, an aquifer prediction model is generated and trained using the model building/optimizing dataset and machine learning. In model training, geological structure is retrieved from grid maps, which are generated using seismic sections and/or wireline logs. The model only retrieves those inputs already provided by the user. Structural data is in the form of depth horizons measured in either feet or meters below ground level. The data can either be retrieved from an open source database or input by a user. From 210, method 200 proceeds to 212.

At 212, performance of the aquifer prediction model is validated using the model validation dataset. The validation is done using the data subset that has been reserved for this purpose. The trained model is presented with the validation data (without the actual output, the corresponding aquifers). This is the data that was not included in the training process. This is also called a blind test. The test is used to test how well the trained model will generalize on a completely new data outside the training samples. The trained model predicts the aquifers based on the validation data. The output is then compared to the actual aquifers. The accuracy is then determined by estimating the number of correct matches divided by the total number of samples. If the accuracy reaches a certain threshold, such as 90%, then the model is considered good and can be launched into production. Another metric that can be used is the misclassification rate. This is the opposite of accuracy (100−accuracy) or the number of mismatched aquifers divided by the total number of samples. From 212, method 200 proceeds to 214.

At 214, locations of aquifers are predicted during production of a new well using the aquifer prediction model and groundwater chemistry data for the new well. Locations are defined by coordinates in the form of Universal Transverse Mercator (UTM) coordinates, and can also be expressed in degrees. From 214, method 200 proceeds to 216.

At 216, the settings and parameters of equipment used for drilling are changed based on the predicted locations of aquafers. After 216, method 200 can stop.

Workflow 100 and method 200 can be implemented in a way to either get the user to input coordinates and receive all aquifers penetrated in the provided location, alongside its chemical and hydrogeological properties. The workflow can use coding (e.g., on MatLab) that is able to identify aquifers from chemistry data, structure, and depth to water level. Workflow 100 and method 200 can generally be intended for groundwater use and not surface water. Workflow 100 and method 200 differ from current systems in that as the outcome is to predict the aquifer penetrated from either chemistry data alone, or with the addition of structure and water level, all made possible by the big dataset used in training the model. An ultimate goal is to have users identify aquifers and their quality by entering the coordinate after providing an open source to the code.

During the development of application code for use in implementing the present disclosure, original groundwater chemistry data from the corporate database was used for training and testing ML algorithms. The groundwater chemistry data used in the experiment originated from two aquifers that are heavily used for their relatively fresh water in the company's facilities, utilities, and drilling activities. With a total number of water samples of over the "11000" dataset, ML algorithms were tested on nine variables including TDS (Total Dissolved Solids), Sodium (Na), Calcium (Ca), Magnesium (Mg), Chloride (Cl), Sulfate ($SO_4$), Carbonate ($CO_3$), Bicarbonate ($HCO_3$) and pH. The chemistry data were z-normalized by dividing each dataset by its standard deviation according to:

$$\frac{x-m}{sd} \quad (2)$$

where x is the observation, m is the mean of the dataset, and sd is the standard deviation. Once the dataset was z-normalized, PCA was applied by computing the eigenvectors of the covariance matrix of the dataset, as follows:

$$\text{Sigma} = \frac{1}{w} X'X \quad (3)$$

where X is the dataset, Sigma is the covariance matrix of dataset X, w is the number of observations, and X' is the inverse matrix of X.

The eigenvectors and the eigenvalues can be computed using an SVD function in MATLAB. An eigenvector matrix U is calculated, which is essential to evaluate the loadings of each parameter on each Principal Component, and the diagonal matrix S, which contains eigenvalues upon which decision on the number of PCs is based. Once U and S are calculated, the dataset can be projected on the newly calculated dimensions (namely Principal Components or PCs), and the number of dimensions (PCs) is defined by K. This can be achieved using ProjectData function in MATLAB. The actual dataset is then replaced by the scores of the PCs using a simple MATLAB line of coding. The ML algorithms are then applied on the PCs instead of the actual dataset. The ML algorithms can consist of Linear Discriminant Analysis (LDA), Artificial Neural Network (ANN), Naive Bayes (NB), Decision Tree (DT), Support Vector Classification (SVC), K-Nearest Neighbor (KNN), and Random Forest (RF). The dataset can be divided into 70% for training and 30% for testing. A comparison was run on the same dataset with and without PCA to see its effect. The results are as follows in Tables 1 and 2:

TABLE 1

ML on Groundwater Chemistry Data for Two Aquifers Without PCA

| Model | Training Accuracy | | Testing Accuracy | |
| --- | --- | --- | --- | --- |
| | Aquifer 1 | Aquifer 2 | Aquifer 1 | Aquifer 2 |
| LDA | 82.5% | 94.1% | 79% | 95% |
| ANN | 73% q | 79% | 73% | 78% |
| Naïve Bayes | 86% | 99% | 82% | 93% |
| DT | 97% | 99% | 93% | 96% |
| SVC | 90% | 97% | 89% | 97% |
| KNN | 100% | 100% | 93% | 97% |
| RF | 100% | 100% | 97% | 98% |

TABLE 2

ML on Groundwater Chemistry Data for Two Aquifers With PCA

| Model | Training Accuracy | | Testing Accuracy | |
| --- | --- | --- | --- | --- |
| | Aquifer 1 | Aquifer 2 | Aquifer 1 | Aquifer 2 |
| LDA | 95.3% | 96.4% | 95.6% | 96.8% |
| ANN | 95.3% | 96.9% | 94.7% | 97.5% |
| Naïve Bayes | 95.8% | 96.2% | 96.9% | 96.6% |
| DT | 97.2% | 97.6% | 95.9% | 96.8% |
| SVC | 92.6% | 97.4% | 94.1% | 97.2% |
| KNN | 100% | 100% | 95.7% | 98.1% |
| RF | 99.3% | 99.4% | 96.5% | 97.9% |

It is seen from Table 1 and Table 2 that not only was the application code able to successfully classify aquifers based on groundwater chemistry data, but also PCA enhanced the ML classification process by up to 12%.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and ML. The analysis can be used to generate changes to settings of downhole equipment, such as drilling equipment and oil/water based drilling mud. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions. Outputs of the techniques of the present disclosure can also be used to spot changes to groundwater quality due to salinization or contamination, and to propose alternative water supply resources. The outputs can also be used to validate current numerical modeling and suggest enhances in terms of uncertainty and sensitivity analysis. Results can be applied elsewhere to predict groundwater chemistry, depth, and water level in areas with no control points, and suggest enhancements to proposed water well designs and drilling programs.

Figure 3:
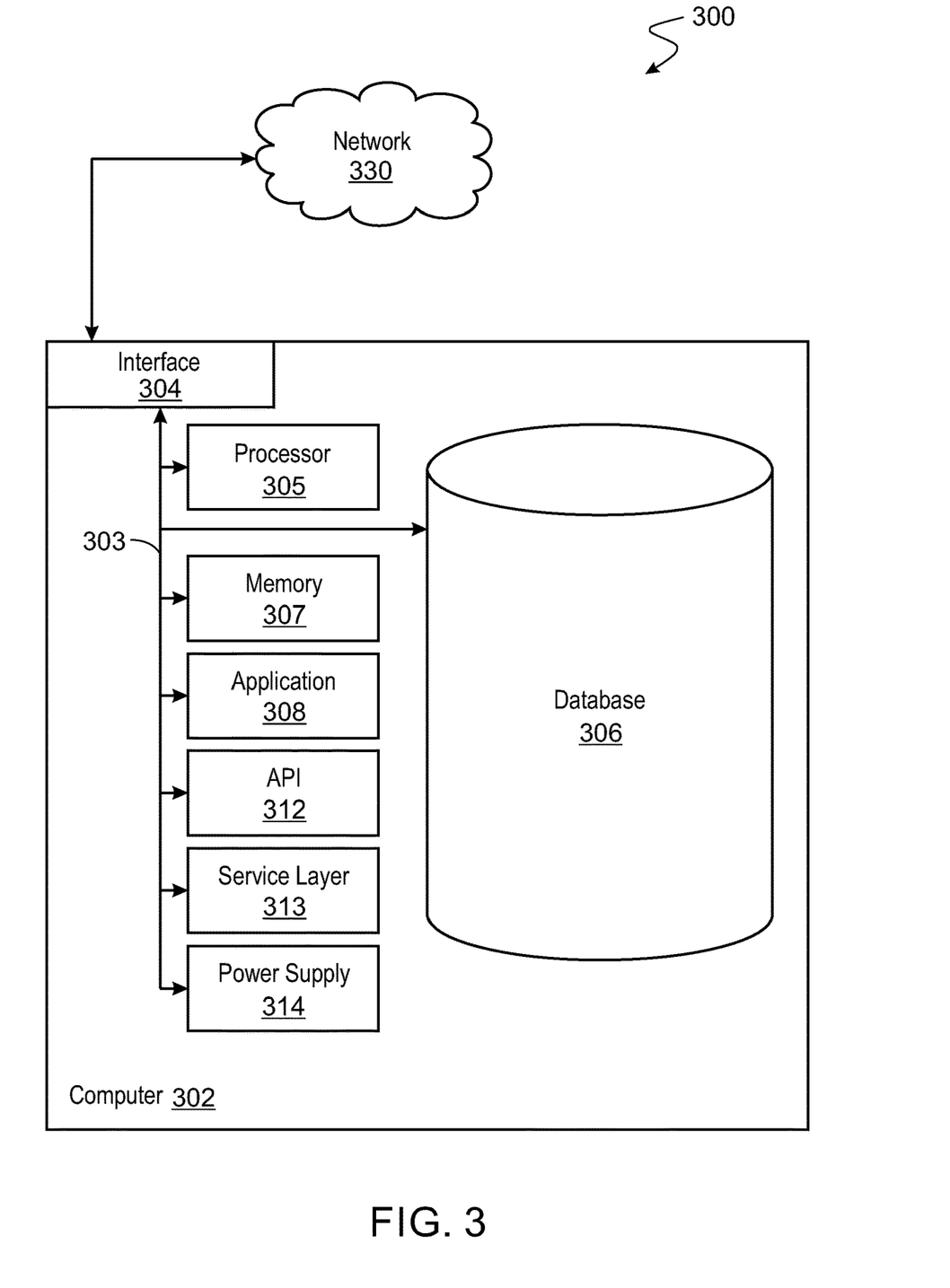
FIG. 3 is a block diagram illustrating an example computer system used to provide computational functionalities associated with described algorithms, methods, functions, processes, flows, and procedures as described in the present disclosure, according to some implementations of the present disclosure.

FIG. 3 is a block diagram of an example computer system 300 used to provide computational functionalities associated with described algorithms, methods, functions, processes, flows, and procedures described in the present disclosure, according to some implementations of the present disclosure. The illustrated computer 302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 302 can include input devices such as keypads, keyboards, and touch screens that can accept user information. Also, the computer 302 can include output devices that can convey information associated with the operation of the computer 302. The information can include digital data, visual data, audio information, or a combination of information. The information can be presented in a graphical user interface (UI) (or GUI).

The computer 302 can serve in a role as a client, a network component, a server, a database, a persistency, or components of a computer system for performing the subject matter described in the present disclosure. The illustrated computer 302 is communicably coupled with a network 330. In some implementations, one or more components of the computer 302 can be configured to operate within different environments, including cloud-computing-based environments, local environments, global environments, and combinations of environments.

At a top level, the computer 302 is an electronic computing device operable to receive, transmit, process, store, and manage data and information associated with the described subject matter. According to some implementations, the computer 302 can also include, or be communicably coupled with, an application server, an email server, a web server, a caching server, a streaming data server, or a combination of servers.

The computer 302 can receive requests over network 330 from a client application (for example, executing on another computer 302). The computer 302 can respond to the received requests by processing the received requests using software applications. Requests can also be sent to the computer 302 from internal users (for example, from a command console), external (or third) parties, automated applications, entities, individuals, systems, and computers.

Each of the components of the computer 302 can communicate using a system bus 303. In some implementations, any or all of the components of the computer 302, including hardware or software components, can interface with each other or the interface 304 (or a combination of both) over the system bus 303. Interfaces can use an application programming interface (API) 312, a service layer 313, or a combination of the API 312 and service layer 313. The API 312 can include specifications for routines, data structures, and object classes. The API 312 can be either computer-language independent or dependent. The API 312 can refer to a complete interface, a single function, or a set of APIs.

The service layer 313 can provide software services to the computer 302 and other components (whether illustrated or not) that are communicably coupled to the computer 302. The functionality of the computer 302 can be accessible for all service consumers using this service layer. Software services, such as those provided by the service layer 313, can provide reusable, defined functionalities through a defined interface. For example, the interface can be software written in JAVA, C++, or a language providing data in extensible markup language (XML) format. While illustrated as an integrated component of the computer 302, in alternative implementations, the API 312 or the service layer 313 can be stand-alone components in relation to other components of the computer 302 and other components communicably coupled to the computer 302. Moreover, any or all parts of the API 312 or the service layer 313 can be implemented as child or sub-modules of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302 and the described functionality. The interface 304 can be used by the computer 302 for communicating with other systems that are connected to the network 330 (whether illustrated or not) in a distributed environment. Generally, the interface 304 can include, or be implemented using, logic encoded in software or hardware (or a combination of software and hardware) operable to communicate with the network 330. More specifically, the interface 304 can include software supporting one or more communication protocols associated with communications. As such, the network 330 or the interface's hardware can be operable to communicate physical signals within and outside of the illustrated computer 302.

The computer 302 includes a processor 305. Although illustrated as a single processor 305 in FIG. 3, two or more processors 305 can be used according to particular needs, desires, or particular implementations of the computer 302 and the described functionality. Generally, the processor 305 can execute instructions and can manipulate data to perform the operations of the computer 302, including operations using algorithms, methods, functions, processes, flows, and procedures as described in the present disclosure.

The computer 302 also includes a database 306 that can hold data for the computer 302 and other components connected to the network 330 (whether illustrated or not). For example, database 306 can be an in-memory, conventional, or a database storing data consistent with the present disclosure. In some implementations, database 306 can be a combination of two or more different database types (for example, hybrid in-memory and conventional databases) according to particular needs, desires, or particular implementations of the computer 302 and the described functionality. Although illustrated as a single database 306 in FIG. 3, two or more databases (of the same, different, or combination of types) can be used according to particular needs, desires, or particular implementations of the computer 302 and the described functionality. While database 306 is illustrated as an internal component of the computer 302, in alternative implementations, database 306 can be external to the computer 302.

The computer 302 also includes a memory 307 that can hold data for the computer 302 or a combination of components connected to the network 330 (whether illustrated or not). Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same, different, or combination of types) can be used according to particular needs, desires, or particular implementations of the computer 302 and the described functionality. While memory 307 is illustrated as an internal component of the computer 302, in alternative implementations, memory 307 can be external to the computer 302.

The application 308 can be an algorithmic software engine providing functionality according to particular needs, desires, or particular implementations of the computer 302 and the described functionality. For example, application 308 can serve as one or more components, modules, or applications. Further, although illustrated as a single application 308, the application 308 can be implemented as multiple applications 308 on the computer 302. In addition, although illustrated as internal to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion and management circuits, including recharging, standby, and power management functionalities. In some implementations, the power supply 314 can include a power plug to allow the computer 302 to be plugged into a wall socket or a power source to, for example, power the computer 302 or recharge a rechargeable battery.

There can be any number of computers 302 associated with, or external to, a computer system containing computer 302, with each computer 302 communicating over network 330. Further, the terms "client," "user," and other appropriate terminology can be used interchangeably, as appropriate, without departing from the scope of the present disclosure.

Moreover, the present disclosure contemplates that many users can use one computer 302 and one user can use multiple computers 302.

Described implementations of the subject matter can include one or more features, alone or in combination.

For example, in a first implementation, a computer-implemented method includes the following. Missing measurements in groundwater chemistry data from aquifers are replaced with calculated equivalents. The groundwater chemistry data is split into a model building/optimizing dataset and a model validation dataset. The groundwater chemistry data is normalized. A dimensionality reduction is performed on the groundwater chemistry data, including identifying principal components. An aquifer prediction model is generated and trained using the model building/optimizing dataset and machine learning. Performance of the aquifer prediction model is validated using the model validation dataset. Locations of aquifers are predicted during production of a new well using the aquifer prediction model and groundwater chemistry data for the new well. Settings, targets, and parameters of equipment used for drilling are changed based on the predicted locations of aquafers and the groundwater chemistry of the aquifers.

The foregoing and other described implementations can each, optionally, include one or more of the following features:

A first feature, combinable with any of the following features, where splitting the groundwater chemistry data into a model building/optimizing dataset and a model validation dataset includes including 70% of the groundwater chemistry data in the model building/optimizing dataset and including 30% of the groundwater chemistry data in the model validation dataset.

A second feature, combinable with any of the previous or following features, where normalizing the groundwater chemistry data includes normalizing groundwater chemistry data values into a range of −1 to 1.

A third feature, combinable with any of the previous or following features, where identifying principal components includes applying Principal Component Analysis (PCA) on the groundwater chemistry data to reduce the dimensionality.

A fourth feature, combinable with any of the previous or following features, where reducing the dimensionality of the dataset includes reducing components to three principal components having highest influences.

A fifth feature, combinable with any of the previous or following features, where the locations of aquifers are defined by coordinates in the form of Universal Transverse Mercator (UTM) coordinates.

A sixth feature, combinable with any of the previous or following features, where the locations of aquifers are expressed in degrees.

In a second implementation, a non-transitory, computer-readable medium stores one or more instructions executable by a computer system to perform operations including the following. Missing measurements in groundwater chemistry data from aquifers are replaced with calculated equivalents. The groundwater chemistry data is split into a model building/optimizing dataset and a model validation dataset. The groundwater chemistry data is normalized. A dimensionality reduction is performed on the groundwater chemistry data, including identifying principal components. An aquifer prediction model is generated and trained using the model building/optimizing dataset and machine learning. Performance of the aquifer prediction model is validated using the model validation dataset. Locations of aquifers are predicted during production of a new well using the aquifer prediction model and groundwater chemistry data for the new well. Settings, targets, and parameters of equipment used for drilling are changed based on the predicted locations of aquafers and the groundwater chemistry of the aquifers.

The foregoing and other described implementations can each, optionally, include one or more of the following features:

A first feature, combinable with any of the following features, where splitting the groundwater chemistry data into a model building/optimizing dataset and a model validation dataset includes including 70% of the groundwater chemistry data in the model building/optimizing dataset and including 30% of the groundwater chemistry data in the model validation dataset.

A second feature, combinable with any of the previous or following features, where normalizing the groundwater chemistry data includes normalizing groundwater chemistry data values into a range of −1 to 1.

A third feature, combinable with any of the previous or following features, where identifying principal components includes applying Principal Component Analysis (PCA) on the groundwater chemistry data to reduce the dimensionality.

A fourth feature, combinable with any of the previous or following features, where reducing the dimensionality of the dataset includes reducing components to three principal components having highest influences.

A fifth feature, combinable with any of the previous or following features, where the locations of aquifers are defined by coordinates in the form of Universal Transverse Mercator (UTM) coordinates.

A sixth feature, combinable with any of the previous or following features, where the locations of aquifers are expressed in degrees.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Missing measurements in groundwater chemistry data from aquifers are replaced with calculated equivalents. The groundwater chemistry data is split into a model building/optimizing dataset and a model validation dataset. The groundwater chemistry data is normalized. A dimensionality reduction is performed on the groundwater chemistry data, including identifying principal components. An aquifer prediction model is generated and trained using the model building/optimizing dataset and machine learning. Performance of the aquifer prediction model is validated using the model validation dataset. Locations of aquifers are predicted during production of a new well using the aquifer prediction model and groundwater chemistry data for the new well. Settings, targets, and parameters of equipment used for drilling are changed based on the predicted locations of aquifers and the groundwater chemistry of the aquifers.

The foregoing and other described implementations can each, optionally, include one or more of the following features:

A first feature, combinable with any of the following features, where splitting the groundwater chemistry data into a model building/optimizing dataset and a model validation dataset includes including 70% of the groundwater chemistry data in the model building/optimizing dataset and including 30% of the groundwater chemistry data in the model validation dataset.

A second feature, combinable with any of the previous or following features, where normalizing the groundwater chemistry data includes normalizing groundwater chemistry data values into a range of −1 to 1.

A third feature, combinable with any of the previous or following features, where identifying principal components includes applying Principal Component Analysis (PCA) on the groundwater chemistry data to reduce the dimensionality.

A fourth feature, combinable with any of the previous or following features, where reducing the dimensionality of the dataset includes reducing components to three principal components having highest influences.

A fifth feature, combinable with any of the previous or following features, where the locations of aquifers are defined by coordinates in the form of Universal Transverse Mercator (UTM) coordinates.

A sixth feature, combinable with any of the previous or following features, where the locations of aquifers are expressed in degrees.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    replacing, in groundwater chemistry data from aquifers, missing measurements with calculated equivalents;
    splitting the groundwater chemistry data into a model building/optimizing dataset and a model validation dataset;
    normalizing the groundwater chemistry data;
    performing a dimensionality reduction on the groundwater chemistry data, comprising identifying principal components, wherein identifying principal components comprises applying Principal Component Analysis (PCA) on the groundwater chemistry data to reduce the dimensionality of the dataset by reducing components to three principal components having highest influences;
    generating and training, using the model building/optimizing dataset and machine learning, an aquifer prediction model;
    validating, using the model validation dataset, performance of the aquifer prediction model;
    predicting, during production of a new well and using the aquifer prediction model and groundwater chemistry data for the new well, locations of aquifers; and
    changing, based on the locations and the groundwater chemistry of the aquifers, settings, targets, and parameters of equipment used for drilling the aquifers.

2. The computer-implemented method of claim 1, wherein splitting the groundwater chemistry data into a model building/optimizing dataset and a model validation dataset comprises assigning 70% of the groundwater chemistry data as the model building/optimizing dataset and comprising 30% of the groundwater chemistry data as the model validation dataset.

3. The computer-implemented method of claim 1, wherein normalizing the groundwater chemistry data comprises normalizing groundwater chemistry data values into a range of −1 to 1.

4. The computer-implemented method of claim 1, wherein the locations of aquifers are defined by coordinates formatted as Universal Transverse Mercator (UTM) coordinates.

5. The computer-implemented method of claim 1, wherein the locations of aquifers are expressed in degrees.

6. A non-transitory, computer-readable medium storing one or more instructions executable by a computer system to perform operations comprising:
    replacing, in groundwater chemistry data from aquifers, missing measurements with calculated equivalents;

splitting the groundwater chemistry data into a model building/optimizing dataset and a model validation dataset;

normalizing the groundwater chemistry data;

performing a dimensionality reduction on the groundwater chemistry data, comprising identifying principal components, wherein identifying principal components comprises applying Principal Component Analysis (PCA) on the groundwater chemistry data to reduce the dimensionality of the dataset by reducing components to three principal components having highest influences;

generating and training, using the model building/optimizing dataset and machine learning, an aquifer prediction model;

validating, using the model validation dataset, performance of the aquifer prediction model;

predicting, during production of a new well and using the aquifer prediction model and groundwater chemistry data for the new well, locations of aquifers; and changing, based on the locations and the groundwater chemistry of the aquifers, settings, targets, and parameters of equipment used for drilling the aquifers.

7. The non-transitory, computer-readable medium of claim 6, wherein splitting the groundwater chemistry data into a model building/optimizing dataset and a model validation dataset comprises assigning 70% of the groundwater chemistry data as the model building/optimizing dataset and comprising 30% of the groundwater chemistry data as the model validation dataset.

8. The non-transitory, computer-readable medium of claim 6, wherein normalizing the groundwater chemistry data comprises normalizing groundwater chemistry data values into a range of −1 to 1.

9. The non-transitory, computer-readable medium of claim 6, wherein the locations of aquifers are defined by coordinates formatted as Universal Transverse Mercator (UTM) coordinates.

10. The non-transitory, computer-readable medium of claim 6, wherein the locations of aquifers are expressed in degrees.

11. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
replacing, in groundwater chemistry data from aquifers, missing measurements with calculated equivalents;
splitting the groundwater chemistry data into a model building/optimizing dataset and a model validation dataset;
normalizing the groundwater chemistry data;
performing a dimensionality reduction on the groundwater chemistry data, comprising identifying principal components, wherein identifying principal components comprises applying Principal Component Analysis (PCA) on the groundwater chemistry data to reduce the dimensionality of the dataset by reducing components to three principal components having highest influences;
generating and training, using the model building/optimizing dataset and machine learning, an aquifer prediction model;
validating, using the model validation dataset, performance of the aquifer prediction model;
predicting, during production of a new well and using the aquifer prediction model and groundwater chemistry data for the new well, locations of aquifers; and
changing, based on the locations and the groundwater chemistry of the aquifers, settings, targets, and parameters of equipment used for drilling the aquifers.

12. The computer-implemented system of claim 11, wherein splitting the groundwater chemistry data into a model building/optimizing dataset and a model validation dataset comprises assigning 70% of the groundwater chemistry data as the model building/optimizing dataset and comprising 30% of the groundwater chemistry data as the model validation dataset.

13. The computer-implemented system of claim 11, wherein normalizing the groundwater chemistry data comprises normalizing groundwater chemistry data values into a range of −1 to 1.

14. The computer-implemented system of claim 11, wherein the locations of aquifers are defined by coordinates formatted as Universal Transverse Mercator (UTM) coordinates.

* * * * *